United States Patent [19]

Loewe et al.

[11] Patent Number: 4,889,292

[45] Date of Patent: Dec. 26, 1989

[54] LIGHTPROOF CASSETTE

[75] Inventors: Erhard Loewe, Waldesch; Ludger Bertels, Nottuln, both of Fed. Rep. of Germany

[73] Assignee: E. I. Du Pont De Nemours and Company, Wilmington, Del.

[21] Appl. No.: 345,934

[22] Filed: May 1, 1989

[30] Foreign Application Priority Data

May 11, 1988 [DE] Fed. Rep. of Germany ....... 3816184

[51] Int. Cl.[4] .................. B65H 16/00; B65D 85/67
[52] U.S. Cl. ................................. 242/71.1; 206/409; 354/275
[58] Field of Search .................. 206/409; 242/71.1; 354/275, 277

[56] References Cited

U.S. PATENT DOCUMENTS

| | | | |
|---|---|---|---|
| 3,612,424 | 10/1971 | Friedel | 242/71.1 |
| 4,239,164 | 12/1980 | Barnsbee et al. | 242/71.1 X |
| 4,291,802 | 9/1981 | Buelens | 206/409 |
| 4,597,658 | 7/1986 | Buelen et al. | 354/275 |
| 4,706,904 | 11/1987 | Raymond | 242/71.1 X |
| 4,787,513 | 11/1988 | Aubk et al. | 206/409 X |
| 4,821,876 | 4/1989 | Naito et al. | 242/71.1 |
| 4,832,197 | 5/1989 | Hara | 242/71.1 X |

FOREIGN PATENT DOCUMENTS

| | | |
|---|---|---|
| 0145813 | 12/1983 | European Pat. Off. . |
| 0153505 | 9/1985 | European Pat. Off. . |
| 0227436 | 12/1986 | European Pat. Off. . |
| 2615615 | 4/1975 | Fed. Rep. of Germany . |
| 2950624 | 12/1978 | Fed. Rep. of Germany . |

*Primary Examiner*—William Price
*Attorney, Agent, or Firm*—John E. Griffiths

[57] ABSTRACT

The present invention relates to a light-tight roll-film cassette for holding and dispensing light sensitive material, having lips forming a dispensing slot for the material drawn from the roll, these lips being mechanically enforced by ribs. The cassette has the advantage of improved light-tightness at the dispensing slot without increasing the dispensing forces.

9 Claims, 2 Drawing Sheets

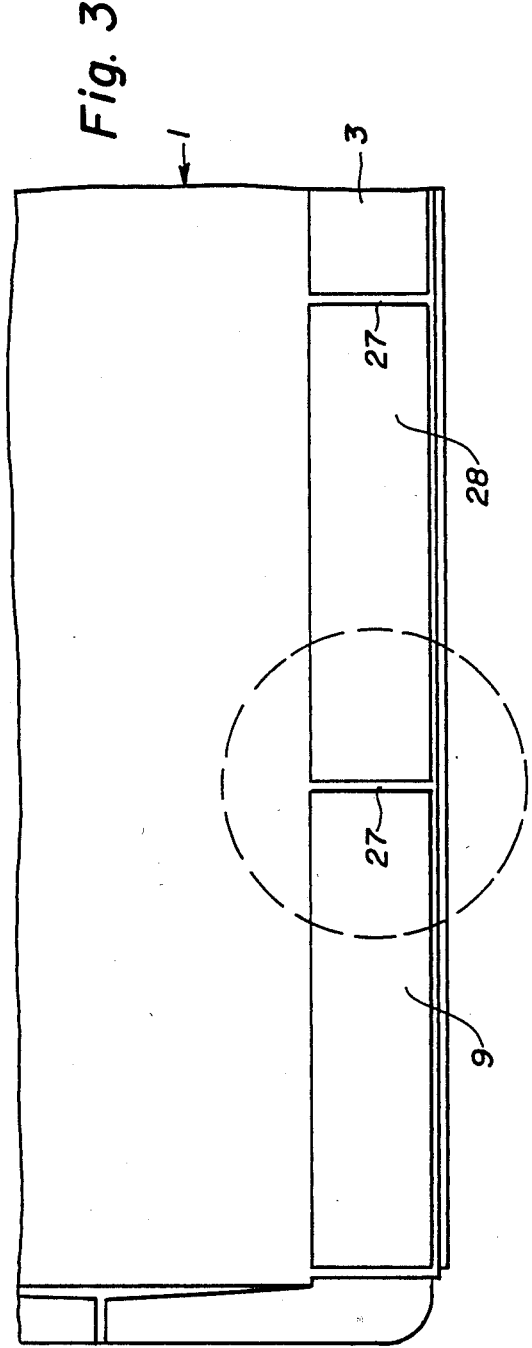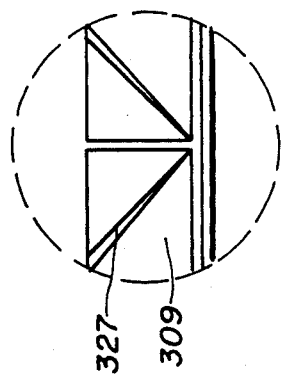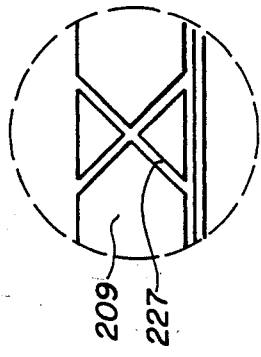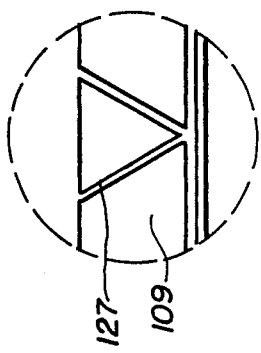

LIGHTPROOF CASSETTE

BACKGROUND OF THE INVENTION

1. Field of the Invention

This invention relates to a lightproof cassette for holding a roll of light-sensitive web material, the cassette having an outlet slit oriented parallel to the axis of the roll, the slit being formed between two lips that are provided in particular with a lining preventing light entry.

2. Description of Related Art

Cassettes that are intended to be light-tight are known in many embodiments. They are used to hold rolls of photographic web material, either film or paper, for various uses, such as portrait photography, photo typesetting, x-ray photography and the like.

Large format cassettes in particular create difficulties in keeping the slit necessary for the web outlet lightproof over the entire width. Under mechanical stress, such as occurs when the web is pulled out, the slit area can be deformed resulting in a wider opening and entry of light. If the slit is narrowed, the forces necessary to pull the web out become too high. This is also particularly pertinent, because cassettes are prepared from synthetic resin, such as polyvinyl chloride, polystyrene, acrylonitrile/butadiene/stryene copolymer or polyethylene, and for cost reasons, can be obtained only with limited wall thicknesses. This disadvantage also appears if the lips are provided with, as is customary, a lining, such as velvet, felt or soft plastic, to prevent light entry.

In one cassette disclosed in German Patent 2,615,615, the lips are positioned at a relatively acute angle, in particular 90°, on the inner side of the cassette housing to improve shape stability and are provided with a reverse curved edge on their free ends. However, this restricts significantly flexibility in the placement of the outlet slit.

Another construction disclosed in Eurpoean OS 153,505, has, instead of stiff lips, a number of interlocking elastic lips. This is significantly more expensive.

In another construction disclosed in German OS 2,950,624, a convex (with respect to the slit) lip is in positive tension contact with a concave lip and is separated therefrom when the web is pulled out. This does indeed impart good light exclusion ability, but it increases the force required to unwind the roll.

Although each of these disclosed cassettes consist of a cuboid or cylindrical mid-section, which has lips and two lightproof, side-wall closures joined to it, there are also on the market cassettes consisting of two injection-molded half shells with two projecting lips. The half shells are joined together along their edges. Problems similar to those already disclosed occur at their outlet slit.

It is believed desirable to produce a lightproof cassette with improved light exclusion ability without an increase in the unwinding tensions.

SUMMARY OF THE INVENTION

The present invention is directed to a lightproof cassette with improved light exclusion ability without an increase in the unwinding tensions comprising at least one lip having bars joined on its side facing away from the slit, bars that each have at least one element in a plane, such as, perpendicular to the axis of the roll.

At least the lip which is most susceptible to deflection from the effect of the unwinding tension is reinforced by bars. This reinforcement takes place, at least partially, in the unwind direction, thus in the lengthwise lip direction. In stabilizing the slit up to the present, attention has been directed only to reinforcing the lip in the direction parallel to the roll axis, thus in the direction of the lip width, either by joining the lip to the housing or by angling the end of the lip. Now, the bars of the invention can be used in a supplementary manner. In this case, the stability of the lip is also improved, because the lip is reinforced longitudinally as well as laterally.

It is particularly desirable that the bars also be joined to a section of the cassette housing bordering the lip. In this manner, not only are the lips themselves reinforced, but are additionally supported on the cassette housing. Thus, lip movement is even more significantly reduced.

A preferred embodiment has a lip that projects from the cassette housing to form a depression with the bordering segment of the housing and the bars fit into the depression. Bars positioned in this manner do not change the general cross-section shape of the cassette. Therefore, the cassette can be used in the conventional manner.

It is also desirable that a concave (with respect to the slit) lip and a convex lip form the slit and that the bars positioned on the convex lip contact most of the length of the lip as well as be joined with the cassette housing along at least twice this contact length. As the convex lip is strained, particularly to the point of flexing, by drawing out the web material, the bars form supports braced on the housing, supports that prevent such flexing completely for all practical purposes.

The best results are shown for bars positioned in planes perpendicular to the roll axis. There are also cases in which V-shaped, X-shaped or radial-shaped bars are recommended. This is applicable, for example, if not only longitudinal reinforcement, but also lateral reinforcement is to be achieved.

It is particularly advantageous to have the cassette housing formed from two half shells each with a projecting lip on the outer side and the bars positioned in the channel between the lip and the bordering segment of the housing. The bars are located in a most efficient site and yet do not extend outside the cross-section of the cassette.

Furthermore, the half shells can be injection molded parts. In this manner, the bars can be made with higher accuracy and in one piece with the lip and housing.

In this connection, it is recommended that, for forming the projecting lip near the edge of the shell, the half shells have a segment of the housing at an acute angle to the edge and that bars in planes perpendicular to the roll axis are joined with the lip and this housing segment. In this configuration, the placement of the bars in the injection molding process is possible without special measures.

BRIEF DESCRIPTION OF THE DRAWINGS

The invention can be more fully understood from the following detailed description thereof in connection with accompanying drawings which form a part of this application and in which:

FIG. 3 is a cross-sectional view of the cassette in the direction of the arrow A in FIG. 1.

FIG. 4 illustrates a second embodiment for bars of the cassette.

FIG. 5 illustrates a third embodiment of the bars.

FIG. 6 illustrates a fourth embodiment of the bars.

DESCRIPTION OF THE PREFERRED EMBODIMENT(S)

Figure 1:
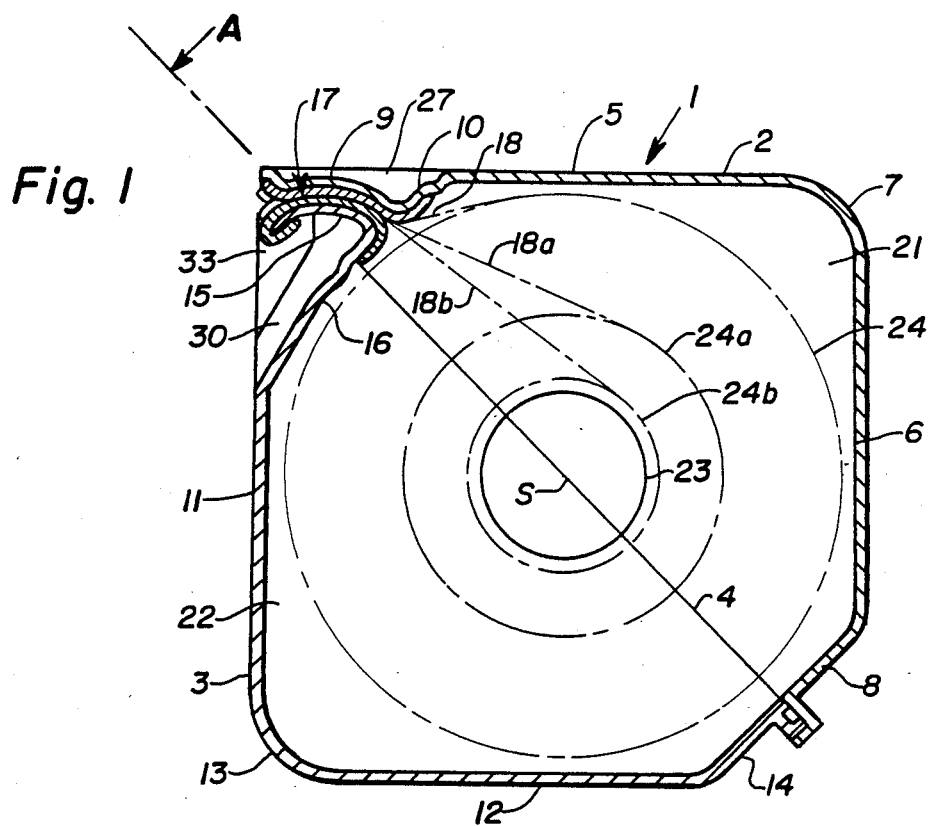
FIG. 1 is a cross-section through a cassette of the present invention.

Throughout the following detailed description, similar reference numerals refer to similar elements in all Figures of the drawings.

Referring to FIG. 1, there is illustrated a cassette 1 in accordance with the present invention. The illustrated cassette 1 consists of a housing having two half shells 2 and 3 that are joined together along a juncture line 4, such as, by ultrasonic bonding. Both half shells 3, 4 are injection molded from resin, for example, ABS, plystyrene or polyamide. The half shell 2 has two wall segments 5 and 6 at right angle to each other and joined together through a curved segment 7, an end segment 8 perpendicular to the juncture line 4 and a concave lip 9 joined with the wall segment 5 through an intermediate segment 10 at an acute angle to the juncture line 4. The half shell 3 has two wall segments 11 and 12 at right angle to each other and joined together through a curved segment 13, an end segment 14 perpendicular to the juncture line 4 and a convex lip joined with the wall segment 11 through an intermediate wall segment 16 at an acute angle to the juncture line 4. The two lips 9, 15 form between them an outlet slit 17 for a roll of photographic web material 18. They are provided with a lining 19 and 20 respectively consisting of a fabric to prevent light entry.

Both half shells 2, 3 have on both ends each a side wall 21 and 22 respectively with a bearing 23 for a roll 24 of photographic web material, the roll being rotatable on the roll axis S. As the web is withdrawn, the diameter of the roll 24 decreases as is shown in two steps by lines 24a and 24b. The angle at which the web 18 enters the outlet slit 17 changes correspondingly. This is shown by lines 18a and 18b.

Figure 2:
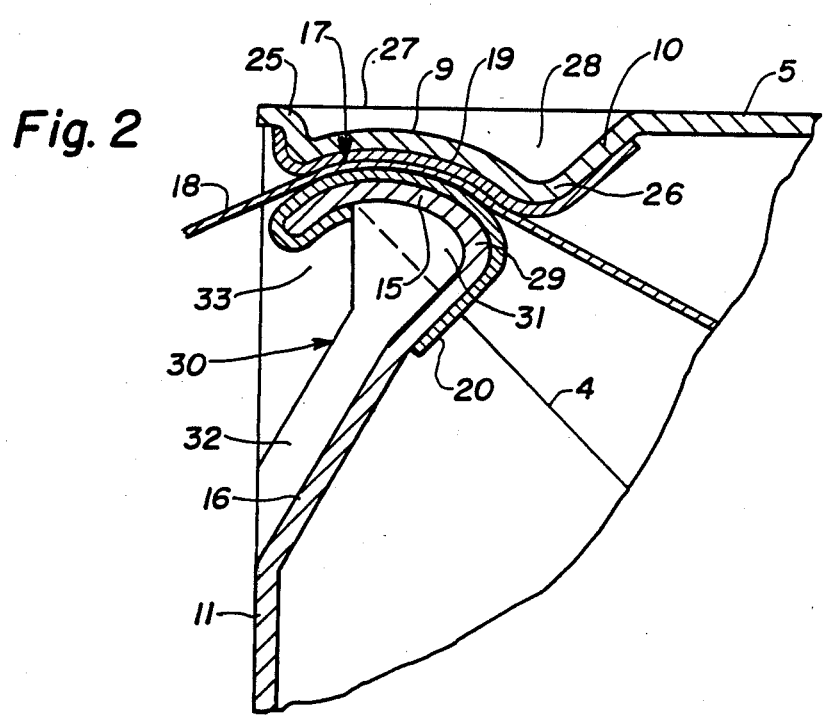
FIG. 2 is an enlarged representation of a lip area of the cassette.

Referring to FIG. 2, the concave lip 9 has an angle edge 25 and is joined with the wall segment 10 through a bend 26. This procedure reinforcement in the direction of the width of the lip 9. In addition, bars 27 are provided that each have an element positioned in planes, such as, perpendicular to the roll axis S and located in a depression 28 formed between the wall segment 10, the lip 9 and the edge 25. See FIG. 3. The upper lip 9 is thus reinforced longitudinally as well as laterally.

The convex lip 15 is joined with the wall segment 16 through a sharp curve 29. In addition, it is reinforced by bars 30 that each have an element in planes, such as, perpendicular to the roll axis S. These bars 30 have a headpiece 31, which is bonded to the lip 15 along most of its length. The bars 30 further have a support segment 32 which is joined to the headpiece 31 so that the length of the bar 30 bonded with the wall segment 16 is three times longer than the length bonded with the lip 15. The bar 30 is also located in a depression or channel.

The convex lip 15 is strained perpendicularly downward in FIGS. 1 and 2 when the roll 24 is unwound. However, deformation is definitely prevented by the bars 30. The forces exerted on the lip 15 are diverted by the bars 30 directly onto the lower half shell 3.

When the half shells 2, 3 are injection-molded, the bars 27 and 30 can be molded with them, as the pieces can be removed from the mold without difficulty on opening the mold. In addition, the bars are located completely within the substantially quadratic whole cross-section of the cassette, so that the new cassettes can be used directly in place of the currently known cassettes.

The bars 27 and 30 can also have shapes other than those illustrated in FIGS. 1 to 3. For instance, FIG. 4 shows V-shaped bars 127 on the lip 109. FIG. 5 shows X-shaped bars 227 on a lip 209. FIG. 6 shows V-shaped bars 327 on a lip 309. The V-shaped bars 327 vary in thickness from one end to another end. The bars may also be radial-shaped.

The bars improve the stability of the lips to deformation under mechanical strain.

The embodiments shown can be varied in many respects without departing from the basic concept of the invention. In particular, the cassette housing can have a shape of a cuboid or cylindrical mid-section with two opposite side closures.

Those skilled in the art, having the benefit of the teachings of the present invention as hereinabove set forth, can effect numerous modifications thereto. These modifications are to be construed as being encompassed within the scope of the present invention as set forth in the appended claims.

What is claimed is:

1. A lightproof cassette for holding a roll of light-sensitive web material, the cassette comprising: an outlet slit oriented parallel to a rotational axis of the roll, the slit being formed between two lips, which are provided with a lining that prevents light entry, characterized in that at least a first one of the lips is joined on its side away from the slit with bars.

2. The cassette in accordance with claim 1, characterized in that the bars are joined with a segment of the cassette bordering the corresponding lip.

3. The cassette in accordance with claim 2, characterized in that at least the first lip projects from the cassette forming a depression with the bordering segment and in that the bars extend into the depression.

4. The cassette in accordance with claim 1, characterized in that the lip comprise a concave lip that is concave with respect to the slit and a convex lip and in that the bars are positioned on the convex lip and contact most of the length of the convex lip and are joined with segments of the cassette along at least twice this contact length.

5. The cassette in accordance with claim 1, characterized in that the bars are positioned in planes perpendicular to the axis of the roll.

6. The cassette in accordance with claim 1, characterized in that the bars are V-shaped, X-shaped or radial-shaped.

7. The cassette in accordance with claim 1, characterized in that the cassette comprises two half shells, each of the shells having one of the lips on an outer side, and the bars are located in a channel between the lip and a bordering housing segment.

8. The cassette in accordance with claim 7, characterized in that the half shells are injection molded parts.

9. The cassette in accordance with claim 8, characterized in that the half shells each have, near an edge of the shell and oriented at an acute angle to the edge of the shells, a housing segment connected to one of the lips and bars positioned in planes perpendicular to the axis of the roll joined with the lip and the housing segment.

* * * * *